United States Patent [19]

Nilson

[11] 4,149,633
[45] * Apr. 17, 1979

[54] TWO-CHAMBER PACKAGE

[75] Inventor: Billy N. Nilson, Mjölby, Sweden

[73] Assignee: KeNova AB, Malmo, Sweden

[*] Notice: The portion of the term of this patent subsequent to Oct. 7, 1992, has been disclaimed.

[21] Appl. No.: 738,524

[22] Filed: Nov. 3, 1976

Related U.S. Application Data

[63] Continuation of Ser. No. 564,550, Apr. 2, 1975, abandoned.

[30] Foreign Application Priority Data

Apr. 26, 1974 [SE] Sweden .................................. 7405618

[51] Int. Cl.² .............................................. B65D 25/08
[52] U.S. Cl. .................................... 206/219; 222/207; 222/449
[58] Field of Search .................. 206/219, 217, 484; 222/94, 207, 209, 212–213, 494, 575

[56] References Cited

U.S. PATENT DOCUMENTS

| 2,219,604 | 10/1940 | Motter | 222/207 |
| 3,361,305 | 1/1968 | Spatz | 222/207 |
| 3,486,663 | 12/1969 | Humphrey | 222/207 |
| 3,807,608 | 4/1974 | Nilsson | 222/521 |
| 3,910,467 | 10/1975 | Nilsson | 222/449 |

FOREIGN PATENT DOCUMENTS 1106499  3/1968  United Kingdom ..................... 222/207

Primary Examiner—Steven E. Lipman
Attorney, Agent, or Firm—Finnegan, Henderson, Farabow & Garrett

[57] ABSTRACT

A two-chamber dispensing package comprises a supply chamber and a discharge chamber. The discharge chamber has a discharge opening closed by means of a self-closing closure and communicates with the supply chamber via an opening. The discharge member has a flexible wall which may be manually deformed to generate a pressure upon the content of said discharge chamber thereby opening said closure and discharging content therefrom. The partition between the two chambers may be a curved flexible wall with an opening and the manual pressure may be exerted upon a wall of the package which thereby covers said opening to give an accurately measured discharge from said discharge chamber.

7 Claims, 5 Drawing Figures

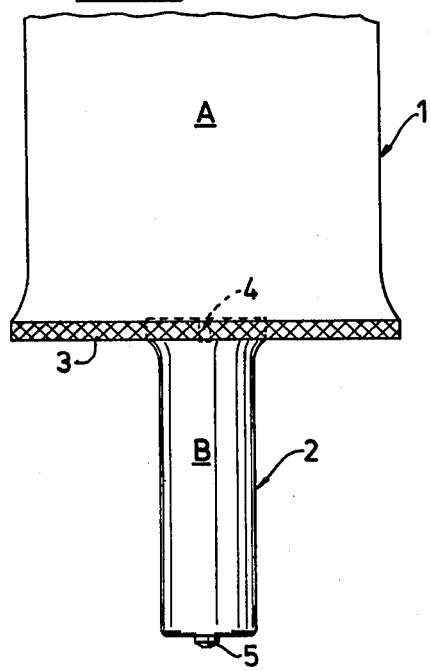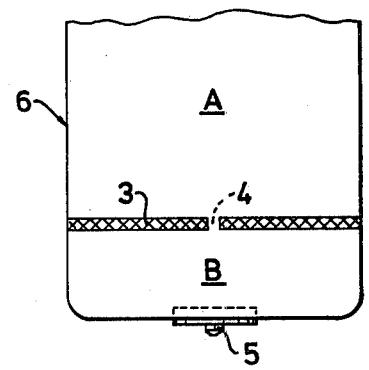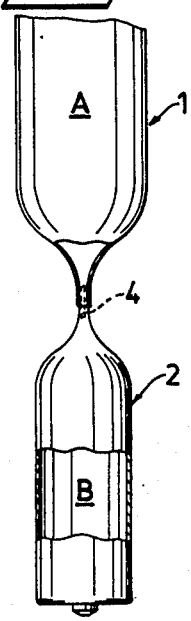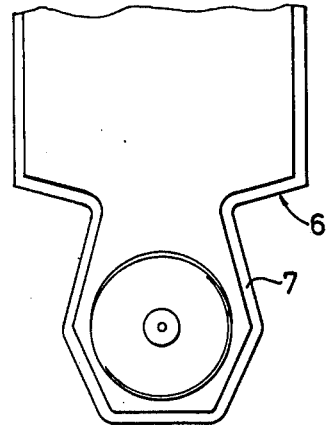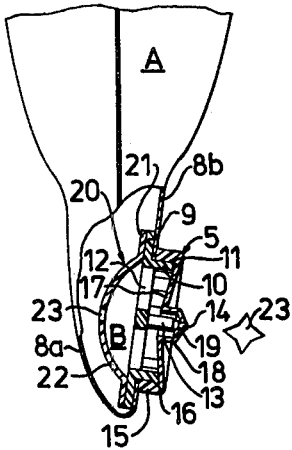

TWO-CHAMBER PACKAGE

This is a continuation of application Ser. No. 564,550 filed Apr. 2, 1975 now abandoned.

This invention refers to a two-chamber package.

In a known two-chamber package the two chambers contain two different substances which are intended to be kept separated from each other until the use thereof when said substances are mixed. For this purpose two-chamber dispensing packages of the kind referred to are generally provided with a common outlet for the two substances.

Recently a two-chamber package has been designed in which the two chambers are intended to contain the same substance and in which one of the chambers has a big volume as compared to the volume of the other one thus serving as a supply chamber whereas the smaller volume chamber serves as a discharge chamber. In this known two-chamber package the two chambers are separated from each other by means of a rigid wall provided with an opening which is closed by means of a diaphragm provided with a relatively narrow opening which in one position of said diaphragm is in sealing contact with a valve means connected to the smaller chamber. Owing to the fact that the latter chamber has an outlet opening with a valve which opens in response to a predetermined pressure in said smaller chamber a pressure exerted upon the content of the supply chamber will cause such substance to fill the discharge chamber and consequently open the valve thereof such that substance is discharged through the outlet opening of said discharge opening.

The latter package thus renders it possible to discharge approximately measured quantities of a substance from the package. However the fact that the package must have a rigid bottom and a diaphragm with a relatively large area as well as a valve means for cooperation with said diaphragm makes the package relatively expensive and the production of the supply chamber also causes troubles as it must have a rigid bottom and a deformable wall when the pressure upon the substance is to be applied by manually deforming said wall.

This invention provides an improvement in the latter type of dispensing package.

One object of the invention is to provide a considerably cheaper product. A still further object is to achieve a very accurately measured quantity of the substance to be discharged every time a manual pressure is exerted upon the package.

To accomplish these and other objects the invention is carried out according to the claims.

In the accompanying drawing some exemplary embodiments of the invention are illustrated.

FIG. 1 illustrates a first embodiment of the invention in a front view.

FIG. 2 is a side view of said first embodiment.

FIG. 3 illustrates a second embodiment of the invention in a front view.

FIG. 4 shows a third embodiment of the invention in a front view and

FIG. 5 illustrates the embodiment according to FIG. 4 in a side view partly broken.

In the embodiment illustrated in FIG. 1 the supply chamber A of the package consists of a hose or tube preferably made from a plastic material and the discharge chamber B thereof also preferably consists of a plastic hose or tube 2 which is connected to hose 1 in that the end of said hose 2 is inserted in the opening of hose 1 and connected thereto by means of a welding joint 3. As appears from FIG. 1 said welding joint is interrupted to form an opening as at 4 and the communication between the two chambers A and B thus obtained constitutes the sole communication between the two chambers. The hose 2 has secured to its free end a self-closing closure 5 which functions in such a manner that it opens in response to a predetermined pressure within chamber B and is closed when said pressure ceases. A self-closing closure suitable for the purpose will be described more in detail with reference to FIG. 5. The communication 4 is calibrated with consideration of inter alia the fluid to be contained in the package, the pressure for which the valve opens and the stiffness of the material used for producing the package.

The package now described may be filled through the opening of the hose 1 and this opening may then be closed by means of folding, welding or the like. The package is primarily intended to be used hanging according to FIG. 1. A slight pressure upon the hose 2 is sufficient for producing the required pressure upon the content of hose 2. The comparatively quick increase of pressure which is then obtained is sufficient for opening the valve of the closure 5 owing to the fact that the opening 4 is comparatively narrow. A certain amount of fluid will then be discharged from the package through the closure 5.

In FIG. 3 a still more simple embodiment of the invention is illustrated. Instead of using two hose-shaped members one single plastic bag 6 is used. By means of a welding joint 3 with an interruption as at 4 said plastic bag is divided into a supply chamber A and a discharge chamber B. The latter chamber is provided with the self-closing closure. Also in this embodiment discharge is effected by means of a slight pressure upon the lower part of the bag.

The embodiments now described do not allow an accurate measured discharge as the amount which is discharged at each occasion depends upon the rate of the pressure impact upon the hose 2 respectively the lower part of bag 6.

The embodiment shown in FIG. 4 and 5 however makes it possible to obtain a very accurately measured amount of fluid every time the discharge pressure is applied upon the package.

The illustrated embodiment comprises a bag 6 which is preferably made from a plastic sheet material. As appears from FIG. 4 this bag has a lower, narrower part 7. One of the walls of the bags is designated 8a and the opposite wall has reference numeral 8b. The latter wall is provided with an opening in which a self-closing closure 5 is provided. Said closure comprises a first member having an annular flat flange 9 which by means of welding is sealingly secured to the bag wall 8b. Projecting from said flat flange 9 is a tubular portion 10 which in one end thereof has an outwardly directed annular bead 11 for a purpose to be described. Extending from said tubular portion 10 are also a number of spokes 12 which in their central portion support a stem 13 made integral with said spokes and having a preferably end portion of a reduced dimension. The second member of the closure comprises an annular member 15 which embraces the tubular portion 10 and has an internal annular groove 16 intended to form with said bead 11 of said first member a snap connection which means that the two closure members may be connected to each other by merely being pressed together. Extending from the annular member 15 is a diaphragm shaped portion 17 which as appears from FIG. 5 in its normal condition, i.e., the closing position thereof, slopes somewhat inwardly. In its central portion said diaphragm constitutes a sleeve 18 which in its end surface has a discharge opening 19. Said discharge opening is in the closing position of the closure covered by the end portion 14 of stem 13. The closure now described opens in response to a pressure difference between the compartment designated B to which the closure is secured and the free air. Said compartment B at the same time constitutes the discharge chamber whereas the bag in its other parts forms the compartment A which is to be regarded as the supply chamber. The partition wall between said two compartments consists of a flexible, curved element 20 which includes a planar flange 21 which by means of a welding joint is sealingly connected to said flange 9. From said planar flange 21 extends a curved wall 22 which in the centre thereof has an opening 23 the shape of which being apparent from the small figure to the right of FIG. 5.

When a finger is pressed against the package such that the bag wall 8a is pressed against the curved wall 22 within the zone of the opening 23 said finger will close said opening via the bag wall 8a. A continued pressure will deform the curved wall 22 and consequently bring the fluid in chamber B into such a pressure that the closure is opened and fluid is discharged therethrough. If the pressure is maintained until the curved wall is completely pressed in a predetermined amount of fluid will be discharged through the discharge opening 19 of the closure. When the pressure ceases the parts return to their initial position, shown in FIG. 5. As the pressure in the discharge chamber is reduced at the return movement of the curved wall the lower pressure thus obtained tends to hold the bag wall 8a pressed against said curved wall. In order to avoid such an adherence the opening may be star-shaped as shown or have any suitable shape having the effect of preventing such an adherence.

It is also possible to have the closure fully enclosed within the bag in which case the bag wall 8b has no opening but is intended to be partly ruptured such that the discharge opening of the closure will come into contact with the free air. Such rupturing takes place when the content of the package will first be discharged.

What I claim is:

1. A package for dispensing a predetermined volume of fluid in response to applied pressure comprising:

a supply chamber for containing a supply of the fluid;
   a discharge chamber for holding a predetermined volume of the fluid to be dispensed;
   a flexible, volume-determining wall separating said chambers, said wall containing a relatively small opening establishing flow communication between said chambers and permitting the filling of the discharge chamber by the supply chamber;
   a closure connected to said package at said discharge chamber, said closure including both a flexible diaphragm containing a discharge aperture and an immobile stem extending toward said aperture, said diaphragm having a concave surface sloping inwardly for frictionally engaging said stem in said aperture in the closed position of said closure, said closure opening in response to pressure generated by deflection of said volume-determining wall and automatically closing upon release of said pressure;
   closure-actuating means spaced from said flexible, volume-determining wall and movable under pressure to cover said opening and to deflect said flexible, volume-determining wall to effect dispersing of the fluid; and
   wherein said closure is positioned in a side wall of said package and said closure-actuating means comprises a flexible wall of said package opposite said side wall.

2. The package of claim 1 wherein said volume-determining wall is dome-shaped.

3. The package of claim 1 wherein said package comprises a plastic bag divided into said two chambers by said volume-determining wall and said pressure is manual against said flexible wall and said volume-determining wall.

4. The package of claim 3 wherein said volume-determining wall is dome-shaped and said opening is positioned at the top of said dome.

5. The package of claim 1 wherein said opening in said volume-determining wall is shaped to prevent adherence of the flexible wall to the opening following dispensing of the fluid from the discharge chamber, thereby permitting said discharge chamber to be automatically refilled by said supply chamber.

6. The package of claim 5 wherein the opening in said volume-determining wall is star-shaped.

7. The package of claim 1 wherein said package is tube-shaped and said discharge chamber is positioned adjacent one end thereof, said tube-shaped package being constricted in size at the end containing said discharge chamber.

* * * * *